United States Patent
Dierksmeier et al.

(10) Patent No.: US 10,794,282 B2
(45) Date of Patent: Oct. 6, 2020

(54) INLET TURBINE FOR HIGH-MACH ENGINES

(71) Applicant: Rolls-Royce North American Technologies, Inc., Indianapolis, IN (US)

(72) Inventors: Douglas D. Dierksmeier, Franklin, IN (US); Edward C. Rice, Indianapolis, IN (US); Steven W. Tomlinson, Brownsburg, IN (US); Bradley E. Auker, Coatesville, IN (US); Donald Klemen, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 424 days.

(21) Appl. No.: 15/402,848

(22) Filed: Jan. 10, 2017

(65) Prior Publication Data

US 2017/0211476 A1 Jul. 27, 2017

Related U.S. Application Data

(60) Provisional application No. 62/286,725, filed on Jan. 25, 2016.

(51) Int. Cl.
| | | |
|---|---|---|
| F02C 7/00 | (2006.01) | |
| F02C 7/057 | (2006.01) | |
| F02C 3/04 | (2006.01) | |
| F02C 7/042 | (2006.01) | |
| B64D 27/16 | (2006.01) | |

(52) U.S. Cl.
CPC .............. *F02C 7/057* (2013.01); *B64D 27/16* (2013.01); *F02C 3/04* (2013.01); *F02C 7/042* (2013.01); *F05D 2220/323* (2013.01); *F05D 2220/76* (2013.01); *F05D 2220/80* (2013.01); *F05D 2260/20* (2013.01)

(58) Field of Classification Search
CPC .. F02C 7/042; F02C 7/057; F02C 9/16; F05D 2220/323; F05D 2220/80; F05D 2220/10; F05D 2260/20; F02K 7/16; F02K 9/78; F02K 3/075; B64F 2033/026; B64F 33/02
See application file for complete search history.

(56) References Cited

U.S. PATENT DOCUMENTS

| | | | |
|---|---|---|---|
| 3,105,661 A | 10/1963 | Ferri et al. | |
| 3,719,428 A * | 3/1973 | Dettmering | ............... F02C 7/04 415/181 |
| 4,224,790 A | 9/1980 | Christensen | |
| 4,267,775 A | 5/1981 | Sjotun et al. | |
| 4,275,857 A | 6/1981 | Bergsten et al. | |
| 4,368,620 A * | 1/1983 | Giles, Jr. | ................ F02K 7/105 60/245 |
| 5,054,288 A * | 10/1991 | Salemann | ............... F02K 3/075 60/244 |
| 5,076,052 A * | 12/1991 | Wildner | ................. F02C 7/042 60/244 |
| 6,127,758 A | 10/2000 | Murry et al. | |

(Continued)

*Primary Examiner* — Todd E Manahan
*Assistant Examiner* — Edwin Kang
(74) *Attorney, Agent, or Firm* — Barnes & Thornburg LLP

(57) ABSTRACT

An inlet assembly for a high-mach engine includes a gas turbine core, an inlet turbine, and a core-flow director. When in a closed position, the core-flow director forces air to interact with the inlet turbine before entering the gas turbine core.

8 Claims, 3 Drawing Sheets

(56) References Cited

U.S. PATENT DOCUMENTS

| | | |
|---|---|---|
| 6,270,309 B1 | 8/2001 | Ghetzler et al. |
| 7,216,474 B2 | 5/2007 | Bulman et al. |
| RE43,731 E | 10/2012 | Bulman et al. |
| 8,678,310 B2 | 3/2014 | Masoudipour et al. |
| 8,882,028 B2 | 11/2014 | Chase |
| 2004/0159105 A1 | 8/2004 | Tanaka et al. |
| 2006/0064960 A1* | 3/2006 | Johnson ................ F02C 7/042 60/226.3 |
| 2007/0144172 A1 | 6/2007 | Sumser et al. |
| 2011/0150633 A1 | 6/2011 | Baughman |
| 2012/0063879 A1 | 3/2012 | Veilleux, Jr. |
| 2012/0159925 A1* | 6/2012 | Duge ................ F02K 3/02 60/204 |
| 2013/0248657 A1 | 9/2013 | Riordan |
| 2013/0269366 A1* | 10/2013 | Haugen ................ F02C 6/08 60/783 |
| 2015/0252732 A1* | 9/2015 | Kupratis ................ F02C 9/18 60/226.3 |
| 2015/0337762 A1 | 11/2015 | Penda et al. |
| 2016/0105078 A1 | 4/2016 | Santini et al. |
| 2016/0273456 A1 | 9/2016 | Zhang et al. |
| 2017/0082033 A1 | 3/2017 | Wu et al. |

* cited by examiner

INLET TURBINE FOR HIGH-MACH ENGINES

CROSS REFERENCE TO RELATED APPLICATIONS

This application claims priority to and the benefit of U.S. Provisional Patent Application No. 62/286,725, filed 25 Jan. 2016, the disclosure of which is now expressly incorporated herein by reference.

FIELD OF THE DISCLOSURE

The present disclosure relates generally to gas turbine engines, and more specifically to high-mach gas turbine engines adapted for use in very high-speed air vehicles.

BACKGROUND

High-mach gas turbine engines are used to power aircraft, projectiles, and the like. These high-mach gas turbine engines typically include an engine core with a compressor, a combustor, and a turbine. The compressor compresses air drawn into the engine and delivers high pressure air to the combustor. In the combustor, fuel is mixed with the high pressure air and is ignited producing hot, high temperature gasses to drive the turbine and to provide thrust that propels the engine.

Travelling at supersonic speeds can lead to increased pressure in the engine inlet which heats the air entering the engine core to extreme temperatures. Exposing components of the engine core to these extreme temperatures can lead to decreased performance or engine failure. To overcome the damaging temperatures, various cooling methods have been employed to remove the heat from the atmosphere before entering the gas turbine engine. However, the increased weight and maintenance from these methods, such as heat exchangers and refrigeration systems, can lead to decreased engine performance.

SUMMARY

The present disclosure may comprise one or more of the following features and combinations thereof.

A high-mach engine may include a gas turbine core and an inlet assembly including an inlet generator. The gas turbine core may include a compressor, a combustor, and a turbine. The inlet assembly may be configured to selectively cool air that enters the gas turbine core when the high-mach engine is travelling at high speeds. The inlet assembly may be coupled to the gas turbine core. The inlet assembly may define an inlet turbine passageway and an inlet bypass passageway coaxial with the inlet turbine passageway.

In some embodiments, the inlet assembly may include an inlet turbine, a generator, and a core-flow director. The inlet turbine may extend into the inlet turbine passageway. As air travels through the turbine, it expands while passing over the turbine blades while turning a shaft connected to the generator. In this method, work is performed and energy extracted from the air. The shaft driven generator creates electricity that can be used in other parts of the engine or air vehicle. Additional energy is converted to thrust as it heats bypass air.

In illustrative embodiments, the inlet turbine may be configured to be driven by air moving through the inlet turbine passageway thereby removing heat from the air. The generator may be coupled to the inlet turbine to apply a load on the inlet turbine. In an illustrative embodiment, the core-flow director may be movable from (i) an open position arranged to allow air from the inlet bypass passageway to move through the inlet bypass passageway and enter the gas turbine core without interacting with the inlet turbine to (ii) a closed position arranged to block air from moving through the inlet bypass passageway into the gas turbine core forcing air moving toward the gas turbine core to move through the inlet turbine passageway and interact with the inlet turbine so that the air entering the gas turbine core is cooled before interacting with components of the gas turbine core In some embodiments, the core-flow director may include a collar mounted to slide along a central engine axis from the opened position to the closed position. The collar may form an annular ring that extends around the central engine axis. The inlet turbine passageway may form an annular ring and may be coaxial with the collar. The bypass passageway may form an annular ring and may be coaxial with the inlet turbine passageway.

In some embodiments, the high-mach engine may further comprise an inlet control system including a sensor, a core-flow-director actuator, and a controller. The core-flow-director actuator may be configured to move the core-flow director from the opened position to the closed position. The controller may be coupled to the sensor and the core-flow-director actuator. The controller may be configured to direct the core-flow-director actuator to move the core-flow director from the opened position to the closed position in response to receipt of data from the sensor.

In some embodiments, the sensor may be configured to detect a parameter associated with speed of the high-mach engine. The controller may be configured to move the core-flow-director from the opened position to the closed position in response to data indicative of a predetermined speed of the high-mach engine through a surrounding atmosphere. In some embodiments, the predetermined speed may be greater than about mach 4.

In some embodiments, the inlet assembly may include an inlet-flow director movable from an opened position arranged to allow air to enter the inlet turbine passageway to the closed position arranged to block air from moving through the inlet turbine passageway. The core-flow director may include a set of doors mounted to pivot from the opened position to the closed positioned. The inlet-flow director may include a set of doors mounted to pivot from the opened position to the closed position In some embodiments, the high-mach engine may further comprise an inlet control system including a sensor, a core-flow-director actuator, an inlet-flow-director actuator, and a controller coupled to the sensor, the core-flow-director actuator, and the inlet-flow-director actuator. The core-flow-director actuator may be configured to pivot the core-flow director from the opened position to the closed position. The inlet-flow-director actuator may be configured to pivot the inlet-flow director from the opened position to the closed position. The controller may be configured to direct the core-flow-director actuator to pivot the core-flow director from the opened position to the closed position and the inlet-flow-director actuator to pivot the core-flow director from the opened position to closed open position in response to receipt of data from the sensor. At high-speeds the inlet-flow director may be arranged in the open position and the core-flow director may be arranged in the closed position to force air to pass through the inlet turbine passageway to reach the gas turbine core.

According to another aspect of the present disclosure, a high-mach engine may include a gas turbine core and an inlet assembly. The gas turbine core may include a compressor, a combustor, and a turbine. The inlet assembly may include an inlet turbine arranged between the gas turbine core and atmosphere and a core-flow director movable from (i) an opened position arranged to allow air from the atmosphere to enter the gas turbine core without interacting with the inlet turbine to (ii) a closed position arranged to block air from the atmosphere from entering the gas turbine core without interacting with the inlet turbine.

In some embodiments, the inlet assembly may define an inlet turbine passageway and an inlet bypass passageway. The inlet turbine passageway may form an annular ring. In an illustrative embodiment, the bypass passageway may form an annular ring. The inlet bypass passageway may be coaxial with the inlet turbine passageway.

In some embodiments, the high-mach engine may further comprise an inlet control system including a sensor, a core-flow-director actuator configured to move the core-flow director from the opened position to the closed position, and a controller coupled to the sensor and the core-flow-director actuator. The controller may be configured to direct the core-flow-director actuator to move the core-flow director from the opened position to the closed position in response to receipt of data from the sensor indicative of speed of the high-mach engine through a surrounding atmosphere.

In some embodiments, the core-flow director may include a collar forming an annular ring that extends around a central engine axis mounted to slide along the central engine axis from the opened position to the closed position. The core-flow director may include at least one door mounted to pivot from the opened position to the closed positioned.

In some embodiments, the inlet assembly may include an inlet-flow director including at least one door mounted to pivot from an opened position arranged to allow air to enter the inlet turbine passageway to the closed position arranged to block air from moving through the inlet turbine passageway.

According to another aspect of the present disclosure, a method of operating a high-mach engine may include detecting the speed of a high-mach engine moving through a surrounding atmosphere with a sensor coupled to a controller, and moving a core-flow director from an opened position wherein air can flow from atmosphere to a gas turbine core without interacting with an inlet turbine to a closed position forcing air to interact with the inlet turbine to cool the air before reaching the gas turbine core when the sensor detects the high-mach engine moving at a predetermined speed.

These and other features of the present disclosure will become more apparent from the following description of the illustrative embodiments.

DETAILED DESCRIPTION OF THE DRAWINGS

Figure 1:
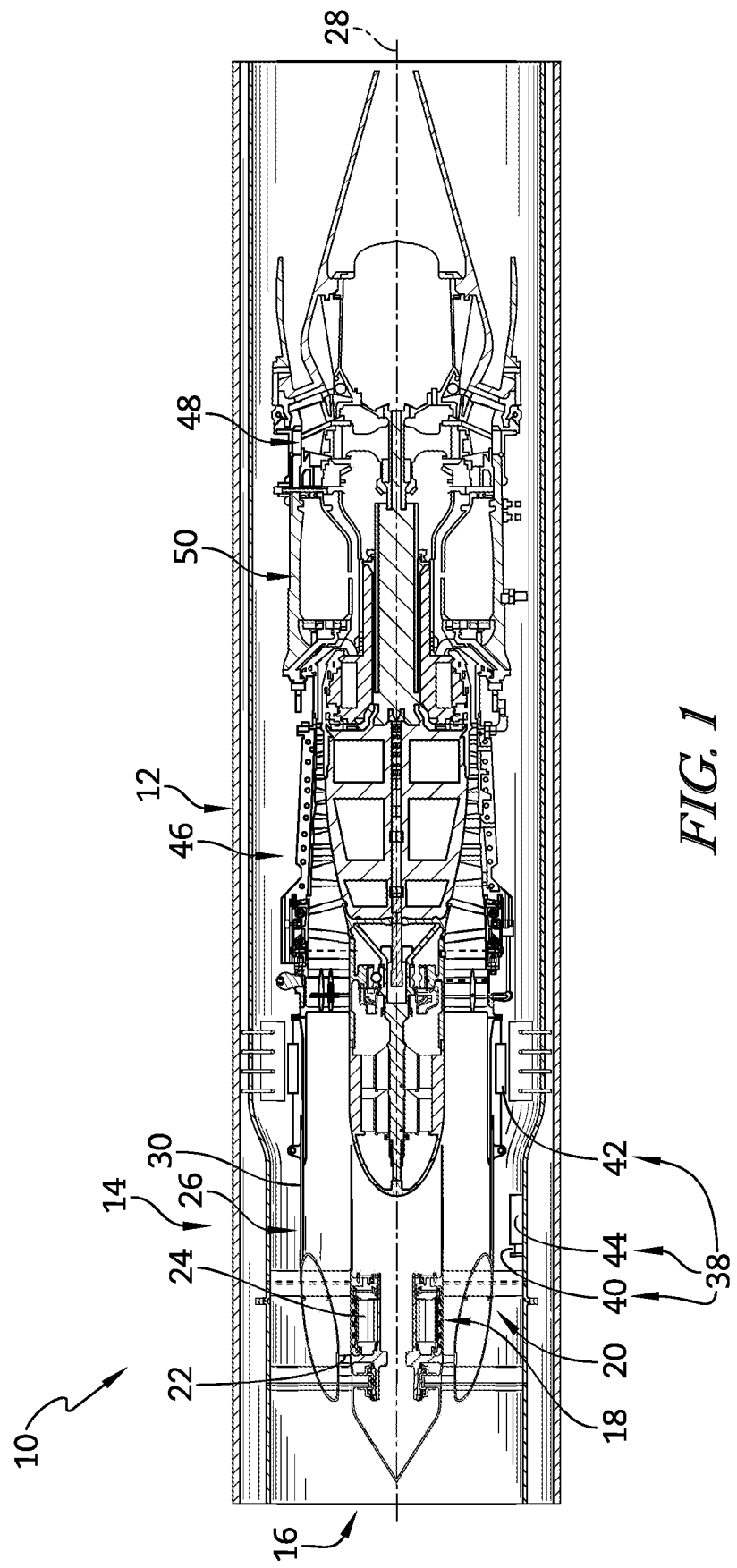
FIG. 1 is a cross sectional view of a high-mach engine that includes a gas turbine core, an inlet turbine adapted to cool air that enters the gas turbine core when the high-mach engine is travelling at a relatively high rate of speed, and a core-flow director configured to selectively allow air to bypass the inlet turbine when the high-mach engine is travelling at a relatively low rate of speed, and further showing that the core-flow director is illustratively provided by a collar mounted to slide along a central engine axis as suggested in FIGS. 2 and 3.

For the purposes of promoting an understanding of the principles of the disclosure, reference will now be made to a number of illustrative embodiments illustrated in the drawings and specific language will be used to describe the same.

Figure 2:
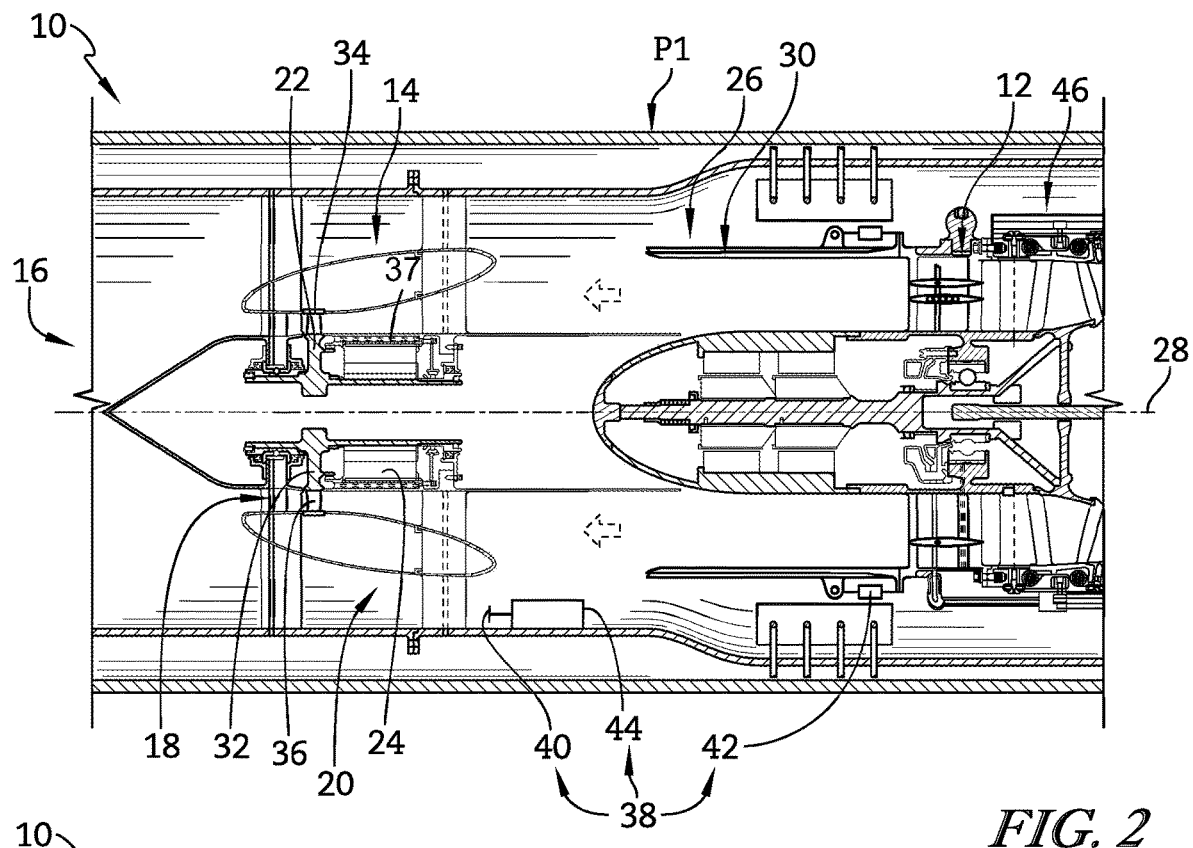
FIG. 2 is a detailed view of a portion of FIG. 1 showing that structure of an inlet assembly, which includes the inlet turbine and the core-flow director, defines an inlet turbine passageway arranged to conduct atmospheric air that interacts with the inlet turbine on its way to the engine core and a bypass passageway arranged to conduct atmospheric air that bypasses the inlet turbine on its way to the engine core, and showing that the core-flow director is in an opened position allowing air to move through the bypass passageway into the gas turbine core (as it would when the high-mach gas turbine engine is travelling at a relatively low rate of speed)
Figure 3:
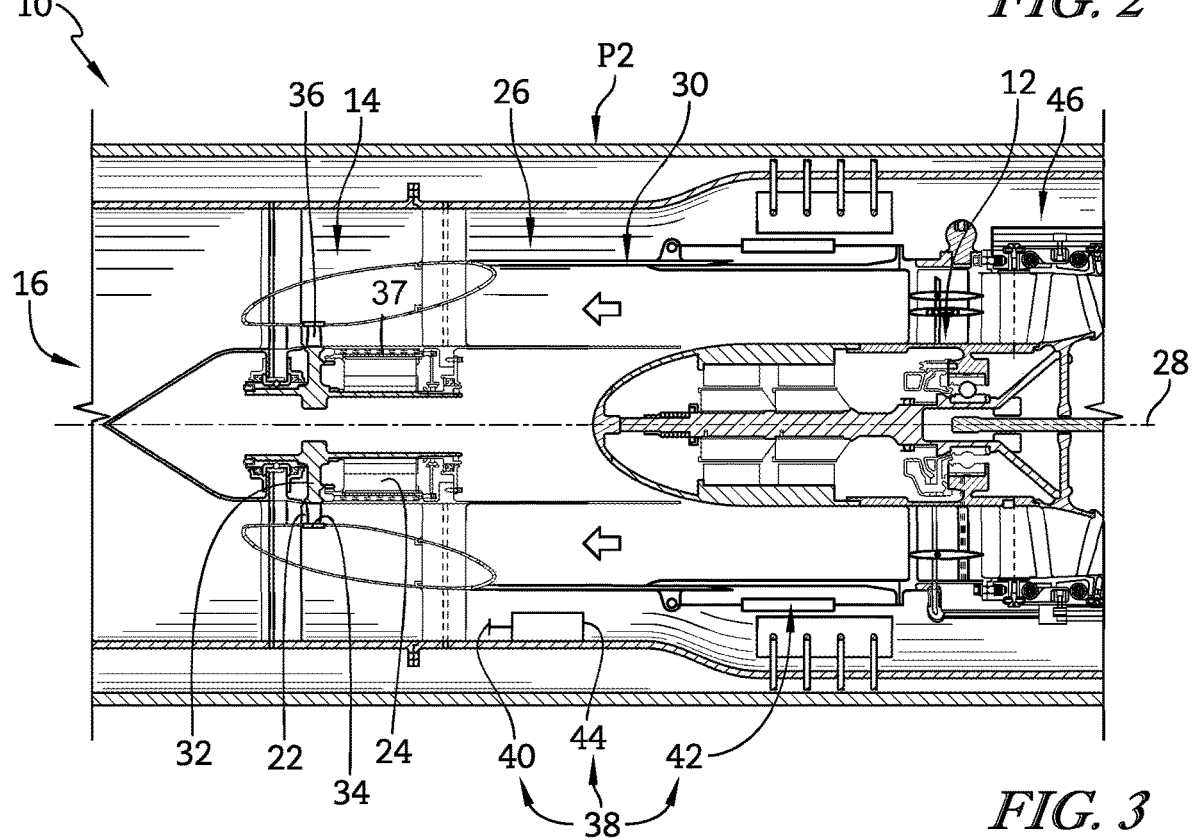
FIG. 3 is a view similar to FIG. 2 with the core-flow director moved to a closed position by sliding along the central engine axis showing the core-flow director blocking air from moving through the bypass passageway into the gas turbine core so that air entering the gas turbine core interacts with the inlet turbine to be cooled (as it would when the high-mach gas turbine engine is travelling at a relatively high rate of speed)
Figure 4:
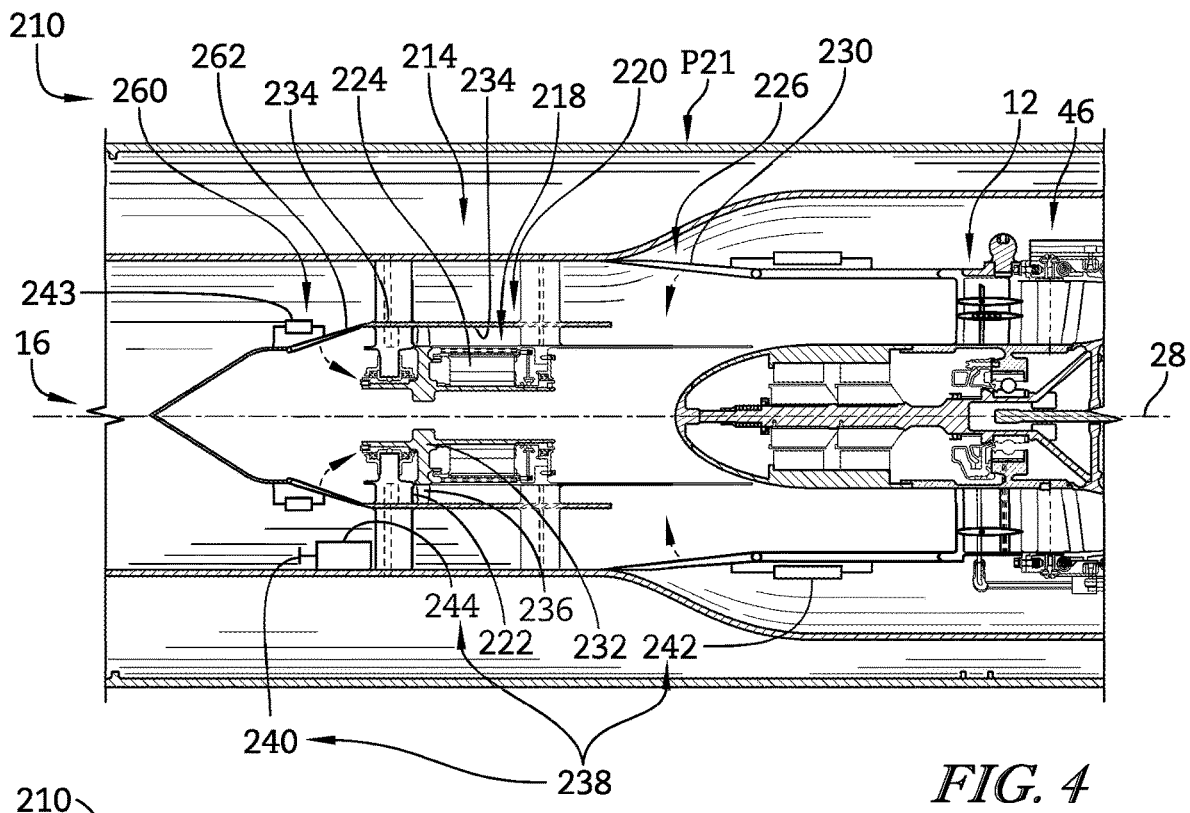
FIG. 4 is a cross sectional view of a portion of another high-mach gas turbine engine similar to that shown in FIGS. 1 and 2 including a gas turbine core, an inlet turbine adapted to cool air that enters the gas turbine core when the high-mach engine is travelling at a relatively high rate of speed, and a core-flow director configured to selectively allow air to bypass the inlet turbine (as it would when the high-mach engine is travelling at a relatively low rate of speed), and further showing that the core-flow director is illustratively provided by a set of doors mounted to pivot from an opened position, shown in FIG. 4, to a closed position, shown in FIG. 5.
Figure 5:
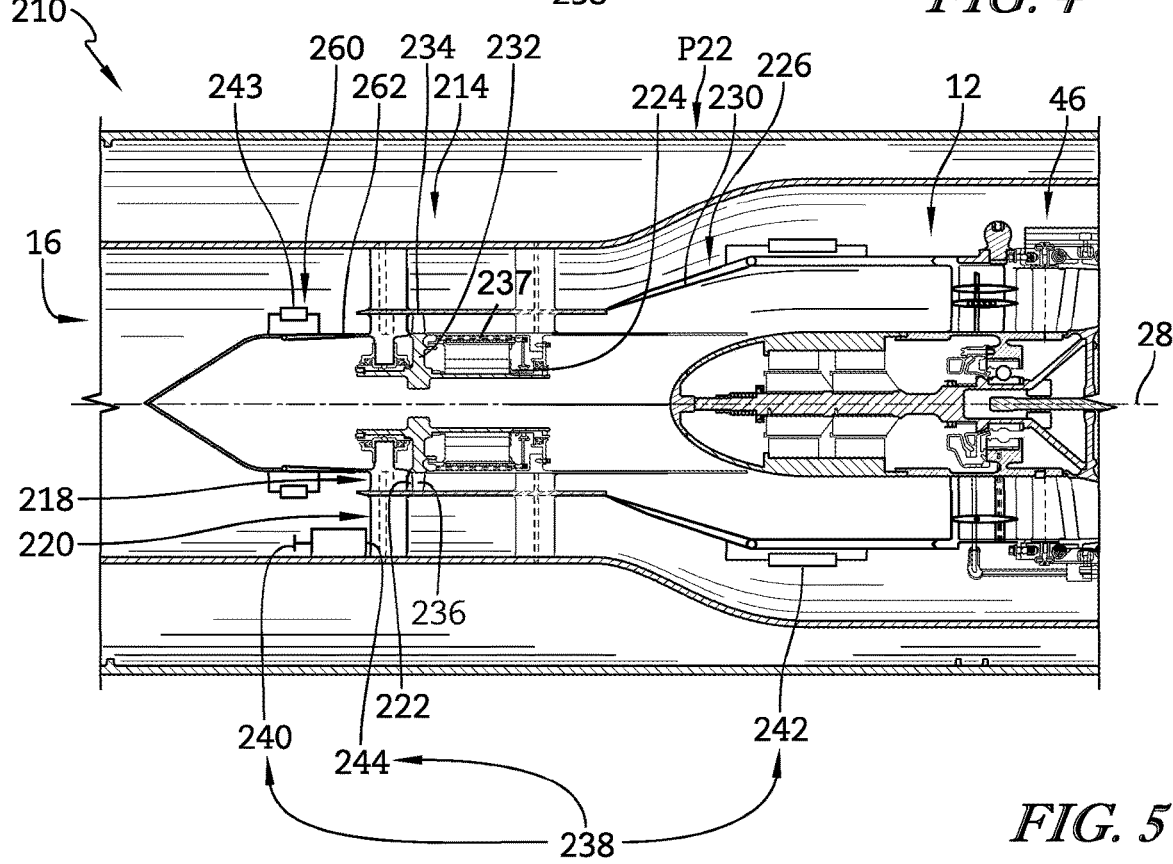
FIG. 5 is a view similar to FIG. 4 with the core-flow director moved to the closed position by pivoting the doors showing the core-flow director blocking air from moving through the bypass passageway into the engine core so that air entering the gas turbine core interacts with the inlet turbine in order to be cooled (as it would when the high-mach gas turbine engine is travelling at a relatively high rate of speed).

An illustrative high-mach engine 10 includes a gas turbine core 12 and an inlet assembly 14 with an inlet turbine 22 adapted to selectively cool air that enters the gas turbine core 12 as shown in FIGS. 1-3. The gas turbine core 12 receives air from atmosphere 16 that is passed through the inlet assembly 14 and provides thrust for propelling the high-mach engine 10. The inlet assembly 14 is coupled to the gas turbine core 12 and is located between the gas turbine core 12 and the atmosphere 16. A core-flow director 26 included in the inlet assembly 14 directs air from the atmosphere 16 to interact with the inlet turbine 22 when the high-mach engine 10 is travelling at relatively high speeds so that the air is cooled before entering the gas turbine core 12. A second embodiment of a high-mach engine 210 incorporating a different core-flow director 226 in accordance with the present disclosure is shown in FIGS. 4 and 5.

The gas turbine core 12 is configured to propel the high-mach engine 10 at speeds in excess of mach 2 and illustratively includes a compressor 46, a core turbine 48, and a combustor 50 as shown in FIG. 1. The compressor 46 compresses the air entering the gas turbine core 12 through a gas turbine inlet 52 and delivers the compressed air to the combustor 50. The combustor 50 mixes fuel with the compressed air received from the compressor 46 and ignites the fuel. The hot, high-pressure products of the combustion reaction in the combustor 50 interact with the core turbine 48 to cause the core turbine 48 to rotate about a central axis 28 and drive the compressor 46. Products of the combustion reaction, after interacting with the core turbine 48, are discharged from the gas turbine core 12 to the atmosphere 16 and provide thrust for the high-mach engine 10.

The inlet assembly 14 is mounted between the compressor 46 and the atmosphere 16 and is configured to cool air from the atmosphere 16 before it enters the compressor 46 when air temperatures are elevated because of the speed of the high-mach engine 10 through the atmosphere 16 as suggested in FIG. 3. Structure of the inlet assembly 14 defines an inlet turbine passageway 18 and an inlet bypass passageway 20 configured so that air entering the high-mach engine 10 must flow through either the inlet turbine passageway 18 or the inlet bypass passageway 20 in order to enter the gas turbine core 12 as shown in FIGS. 1-3.

The inlet assembly 14 illustratively includes the inlet turbine 22, a generator 24, and a core-flow director 26 as shown in FIGS. 1-3. The inlet turbine 22 extends into the inlet turbine passageway 18 and can be driven by air passing through the inlet turbine passageway 18 to cooling the air by removing energy therefrom. The generator 24 is coupled to the inlet turbine 22 to provide a load on the inlet turbine 22. The core-flow director 26 directs air passing through the inlet assembly 14 and is movable from an open position P1 to a closed position P2 when the high-mach engine 10 is travelling at high-speeds so the inlet assembly 14 can cool the air entering the gas turbine core 12.

When the core-flow director 26 is in the open position P1, the core-flow director 26 is arranged to allow air from the inlet bypass passageway 20 to enter with the gas turbine core 12 without interacting with the inlet turbine 22 as shown in FIG. 2. When the core-flow director 26 is in closed position P2, the core-flow director 26 is arranged to block air from moving from the inlet bypass passageway 20 to interact with the gas turbine core 12 thereby forcing air reaching the gas turbine core 12 to pass through the inlet turbine passageway 18 and interact with the inlet turbine 22 to cool the air as shown in FIG. 3.

Illustratively, the inlet turbine passageway 18 and the inlet bypass passageway 20 each form an annular ring and extend around the central axis 28 so the inlet turbine passageway 18 and the inlet bypass passageway 20 are coaxial. In the exemplary embodiment, the core-flow director 26 is provided by a collar 30 that is slidable along a central axis 28 between the opened and closed positions P1, P2. The collar 30 extends around the central axis 28 and is located between the inlet turbine passageway 18 and the inlet bypass passageway 20 when in the closed position P2. In the exemplary embodiment, the collar 30 forms an annular ring and is coaxial with the inlet turbine passageway 18 and the inlet bypass passageway 20.

The inlet turbine 22 includes an inlet turbine wheel assembly 32 and an inlet turbine shroud 34 to locate the inlet turbine passageway 18 therebetween. A set of inlet turbine blades 36 extend from the inlet turbine wheel assembly 32 into the inlet turbine passageway 18 to interact with air passing through the inlet turbine passageway 18. When the core-flow director 26 is in the closed position P2, air is forced to pass through the inlet turbine passageway 18 and interact with the inlet turbine 22 before entering the gas turbine core 12 causing the inlet turbine 22 to rotate.

The generator 24 is coupled to the inlet turbine 22 and provides a load to the inlet turbine 22. When the core-flow director 26 is in the closed position P2, air entering the inlet turbine passageway 18 applies a force to the inlet turbine blades 36 and causing the inlet turbine 22 to rotate. The load applied by the generator 24 applies an opposite force to the inlet turbine 22 causing the inlet turbine 22 to provide resistance to the air passing through the inlet turbine passageway 18 thereby removing energy from the air and cooling the air. The electricity generated by the generator 24 can be used elsewhere in the high-mach engine 10 or for powering a corresponding aircraft or projectile.

The high-mach engine 10 can further include an inlet control system 38 including a sensor 40, a core-flow-director actuator 42, and a controller 44 coupled to the sensor 40 and the core-flow-director actuator 42 as shown in FIGS. 2 and 3. When the sensor 40 detects a certain parameter of the high-mach engine 10 it sends a signal to the controller 44. When the controller 44 receives the data from the sensor 40 it directs the core-flow-director actuator 42 to move the core-flow director 26 from the open position P1 to the closed position P2 thereby forcing air to pass through the inlet turbine passageway 18 before interacting with the gas turbine core 12. Conversely, the controller 44 may direct the core-flow-director actuator 42 to move the core-flow director 26 to the closed position, thereby allowing air to enter the gas turbine core 12 from the inlet bypass passageway 20. Moreover, in some embodiments, the controller 44 can move the core-flow director 26 to various locations between the open position P1 and the closed position P2 based on data from the sensor 40.

The sensor 40 in the illustrative embodiment is configured to detect the speed of the high-mach engine 10 moving through the atmosphere 16. When the sensor 40 detects the high-mach engine 10 moving at a predetermined speed, the sensor 40 sends a signal to the controller 44. It is within the scope of the present disclosure for the predetermined speed to be about, or specifically mach 4 or mach 5. In other embodiments, the predetermined speed is less than mach 4.

The core-flow-director actuator 42 is coupled to the core-flow director 26 and the controller 44 as shown in FIGS. 2 and 3. The core-flow-director actuator 42 functions to move the core-flow director 26 along the central axis 28 from the opened position P1 to the closed position P2 when the controller 44 sends a signal.

In illustrative embodiments, heating elements 37 may be included in the inlet assembly 14 as shown in FIGS. 2 and 3. Heating elements 37 may be located in the bypass duct and can be used to reject energy extracted from the air in the inlet turbine and generator. The heated air may provide additional thrust for the high-mach engine 10.

In another embodiment, the high-mach engine 210 includes a gas turbine core 12 and an inlet assembly 214 with an inlet turbine 222 adapted to selectively cool air that enters the gas turbine core 12 as shown in FIGS. 4-5. The gas turbine core 12 receives air from atmosphere 16 that is passed through the inlet assembly 214 and provides thrust for propelling the high-mach engine 210. The inlet assembly 214 is coupled to the gas turbine core 12 and is located between the gas turbine core 12 and the atmosphere 16. A core-flow director 226 included in the inlet assembly 214 directs air from the atmosphere 16 to interact with the inlet turbine 222 when the high-mach engine 210 is travelling at relatively high speeds so that the air is cooled before entering the gas turbine core 12.

The inlet assembly 214 is mounted between the compressor 46 and the atmosphere 16 and is configured to cool air from the atmosphere 16 before it enters the compressor 46 when air temperatures are elevated because of the speed of the high-mach engine 10 through the atmosphere 16 as suggested in FIG. 4. Structure of the inlet assembly 214 defines an inlet turbine passageway 218 and an inlet bypass passageway 220 configured so that air entering the high-mach engine 210 must flow through either the inlet turbine passageway 218 or the inlet bypass passageway 220 in order to enter the gas turbine core 12 as shown in FIGS. 4-5.

The inlet assembly 214 illustratively includes the inlet turbine 222, a generator 224, and a core-flow director 226 as shown in FIGS. 4-5. The inlet turbine 222 extends into the inlet turbine passageway 218 and can be driven by air passing through the inlet turbine passageway 218 to cooling the air by removing energy therefrom. The generator 224 is coupled to the inlet turbine 222 to provide a load on the inlet turbine 222. The core-flow director 226 directs air passing through the inlet assembly 214 and is movable from an open position P21 to a closed position P22 when the high-mach engine 210 is travelling at high-speeds so the inlet assembly 214 can cool the air entering the gas turbine core 12.

When the core-flow director 226 is in the open position P21, the core-flow director is arranged to allow air from the inlet bypass passageway 220 to enter with the gas turbine core 12 without interacting with the inlet turbine 22 as shown in FIG. 4. When the core-flow director 226 is in closed position P22, the core-flow director 226 is arranged to block air from moving from the inlet bypass passageway 220 to interact with the gas turbine core 12 thereby forcing air reaching the gas turbine core 12 to pass through the inlet turbine passageway 218 and interact with the inlet turbine 222 to cool the air as shown in FIG. 5.

Illustratively, the inlet turbine passageway 218 and the inlet bypass passageway 220 each form an annular ring and extend around the central axis 28 so the inlet turbine passageway 218 and the inlet bypass passageway 220 are coaxial. In the exemplary embodiment, the core-flow director 226 is provided by a set of doors 230 that is mounted to pivot between the opened and closed positions P21, P22. The set of doors 230 extend around the central axis 28 and is located between the inlet turbine passageway 218 and the inlet bypass passageway 220 when in the closed position P22. In the exemplary embodiment, the set of doors 230 forms an annular ring and is coaxial with the inlet turbine passageway 218 and the inlet bypass passageway 220.

In the exemplary embodiment, the inlet assembly 214 further includes a an inlet-flow director 260 configured to allow or block air from entering the inlet turbine passageway 218 and interacting with the inlet turbine 222. Illustratively, the inlet-flow director 260 is provided by a set of doors 262 that is mounted to pivot between the opened and closed positions P21,P22. The set of doors 262 extends around the central axis 28 and is located between the inlet turbine passageway 218 and the inlet bypass passageway 220. In the exemplary embodiment, the set of doors 262 forms an annular ring and is coaxial with the inlet turbine passageway 218 and the inlet bypass passageway 220. Notably, the inlet-flow director 260 may be incorporated into the inlet assembly 14 shown in FIGS. 1-3.

The inlet-flow director 260 and the core-flow director 226 cooperate to control the flow of air through the inlet turbine passageway 218 and the inlet bypass passageway 220 as shown in FIGS. 4 and 5. When the inlet assembly 214 is in the open position P21 the inlet-flow director 260 is closed and the core-flow director 226 is open forcing air to flow through the inlet bypass passageway 220 before entering the gas turbine core 12. Upon receiving a signal from the controller 244 to move to the closed position P22, the inlet-flow director 260 pivots inwardly allowing air to access to the inlet turbine passageway 218 and the core-flow director 226 pivots inwardly blocking access for air passing through the inlet bypass passageway 220 from entering the engine core. The closed position P22 forces are entering the gas turbine core 12 to flow through the inlet turbine passageway 218 and interact with the inlet turbine 222 before entering gas turbine core 12.

The inlet turbine 222 includes an inlet turbine wheel assembly 232 and an inlet turbine shroud 234 to locate the inlet turbine passageway 218 therebetween. A set of inlet turbine blades 236 extend from the inlet turbine wheel assembly 232 into the inlet turbine passageway 218 to interact with air passing through the inlet turbine passageway 218. When the core-flow director 226 is in the closed position P22, air is forced to pass through the inlet turbine passageway 218 and interact with the inlet turbine 222 before entering the gas turbine core 12 causing the inlet turbine 222 to rotate.

The generator 224 is coupled to the inlet turbine 222 and provides a load to the inlet turbine 222. When the core-flow director 226 is in the closed position P22, air entering the inlet turbine passageway 18 applies a force to the inlet turbine blades 36 and causing the inlet turbine 22 to rotate. The load applied by the generator 224 applies an opposite force to the inlet turbine 222 causing the inlet turbine 222 to provide resistance to the air passing through the inlet turbine passageway 218 thereby removing energy from the air and cooling the air. The electricity generated by the generator 224 can be used elsewhere in the high-mach engine 210 or for powering a corresponding aircraft or projectile.

The high-mach engine 210 can further include an inlet control system 238 including a sensor 240, a core-flow-director actuator 242, an inlet-flow director actuator 243, and a controller 244 coupled to the sensor 240, the core-flow-director actuator 242, and the inlet-flow-director actuator as shown in FIGS. 4 and 5. When the sensor 240 detects a certain parameter of the high-mach engine 210 it sends a signal to the controller 244. When the controller 244 receives the data from the sensor 240 it directs the core-flow-director actuator 242 to move the core-flow director 226 and the inlet-flow-director actuator to move the inlet-flow director 260 from the open position P21 to the closed position P22 thereby forcing air to pass through the inlet turbine passageway 218 before interacting with the gas turbine core 12. Conversely, the controller 244 may direct the core-flow-director actuator 242 to move the core-flow director 226 to the closed position P22 and the inlet-flow-director actuator 242 to move the inlet-flow director 260 to the closed position P22, thereby allowing air to enter the gas turbine core 12 from the inlet bypass passageway 220. Moreover, in some embodiments, the controller 244 can move the core-flow director 226 and the inlet-flow director 260 to various locations between the open position P21 and the closed position P22 based on data from the sensor 240.

The sensor 240 in the illustrative embodiment is configured to detect the speed of the high-mach engine 210 moving through the atmosphere 16. When the sensor 240 detects the high-mach engine 210 moving at a predetermined speed, the sensor 240 sends a signal to the controller 244. It is within the scope of the present disclosure for the predetermined speed to be about, or specifically mach-4 or mach-5. In other embodiments, the predetermined speed is less than mach-4.

The core-flow-director actuator 242 is coupled to the core-flow director 226 and the controller 244 as shown in FIGS. 2 and 3. The core-flow-director actuator 242 functions to pivot the set of doors 230 of the core-flow director 226 from the opened position P21 to the closed position P22 when the controller 244 sends a signal.

A method of operating a high-mach engine 10, 210 includes detecting the speed of the high-mach engine 10, 210, and moving a core-flow director 26, 226 from an open position P1, 21 to a closed position P2, 22 in response to the high-mach engine 10, 210 reaching a pre-determined speed as suggested in FIGS. 2-3 and 4-5.

The step of detecting the speed of the high-mach engine 10,210 illustratively is performed by a sensor 40, 240. Upon reaching a pre-determined speed of the high-mach engine 10, 210 moving through the surrounding atmosphere 16, the sensor 40, 240 sends a signal to the controller 44, 244.

The step of moving the core-flow director 26, 226 from the open position P1, 21 to the closed position P2, 22 is performed when the controller 44, 244 receives the signal from the sensor 40, 240. Upon receipt of data from the sensor 40, 240, the controller 44, 244 sends a signal to the core-flow-director actuator 42, 242 to move the core-flow director 26, 226 from the open position P1, 21 to the closed position P2, 22.

When the core-flow director 26, 226 is in the open position air can flow from the atmosphere 16 through the inlet bypass passageway 20, 220 to a gas turbine core 12 without interacting with the inlet turbine 22, 222. When the core-flow director 26, 226 is in the closed position, air is forced to flow through an inlet turbine passageway 18, 218 to interact with the inlet turbine 22, 222 to cool the air before reaching the gas turbine core 12.

High-mach engines have been designed previously such that the overall engine design can be complex. Concepts involving heat exchangers and refrigeration systems have been attempted but are typically heavy and expensive and must be able to survive long periods of storage before use. Embodiments of the present disclosure do not require sealed systems that may leak and become ineffective when called upon for use after many possible years of storage.

In some embodiments, a gas turbine engine with an inlet (e.g., the high-mach engine 10, 210) traveling at mach 4 or greater requires cooling such that materials in the compressor 46 are cool enough to maintain structural properties. A potential solution for cooling may be to place a turbine in the inlet (e.g., inlet turbine 22, 222) to the high-mach engine 10, 210 to take energy out of the high temperature air thus cooling it prior to entry into the compressor 46. Additionally, the work extracted from the inlet turbine 22, 222 can be converted to electricity through the use of a generator 24, 224 for use elsewhere in the high-mach engine 10, 210 or airframe. The inlet turbine 22, 222 can also be connected to an alternate compressor to provide high pressure air for use elsewhere in the engine or airframe.

This invention consists of a gas turbine engine architecture that contains a gas turbine core 12 with a compressor 46, combustor 50, and turbine 48 along with an additional turbine (e.g. the inlet turbine 22, 222) that is placed in the inlet (e.g., in the inlet assembly 14, 214) upstream from the gas turbine core 12. The purpose for placing the additional turbine (e.g. the inlet turbine 22, 222) in the engine inlet is to remove energy in the form of heat from the high temperature air entering the engine inlet at high mach speeds. The inlet turbine 22, 222 can be connected to a device such as but not limited to a generator 24, 224 or compressor by a shaft such that the heat energy removed can be converted to another form of energy that can be used elsewhere in the engine or airframe.

In one embodiment, the inlet door (e.g., the inlet-flow director 260) opens to allow some of the air in the inlet to enter the inlet turbine 22, 222. The bypass door (e.g., the core-flow director 26, 226) also opens to allow the remaining air to reach the gas turbine core 12. Air entering the inlet turbine 22, 222 expands while turning the inlet turbine 22, 222. Analysis indicates that the work removed through this expansion and turning of the inlet turbine 22, 222 is enough to reduce the air temperature exiting the inlet turbine 22, 222 to a level that will not cause stress to the compressor components. The inlet turbine 22, 222 causes the downstream gas turbine core 12 to think it is flying at a slower speed than the vehicle (e.g., the high-mach engine 10, 210) actually is.

In illustrative embodiments, heating elements 237 may be included in the inlet assembly 214. Heating elements 237 may be located in the bypass duct and can be used to reject energy extracted from the air in the inlet turbine and generator. The heated air may provide additional thrust for the high-mach engine 210.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A high-mach engine comprising
a gas turbine core including a compressor, a combustor, and a turbine, and
an inlet assembly at an inlet of the high-mach engine and configured to selectively cool a portion of air that enters the gas turbine core when the high-mach engine is travelling at a speed greater than a predetermined speed coupled to the gas turbine core; the inlet assembly defining an inlet turbine passageway and an inlet bypass passageway coaxial with the inlet turbine passageway, wherein the inlet assembly includes an inlet turbine extending into the inlet turbine passageway and configured to be driven by the portion of air moving through the inlet turbine passageway thereby removing heat from the portion of air, a generator coupled to the inlet turbine to apply a load on the inlet turbine, the generator mechanically independent of the turbine of the gas turbine core, and a core-flow director translatable along a central engine axis from (i) an open position arranged to allow the portion of air from the inlet bypass passageway to move through the inlet bypass passageway and enter the gas turbine core without interacting with the inlet turbine to (ii) a closed position arranged to block the portion of air from moving through the inlet bypass passageway into the gas turbine core, forcing the portion of air moving toward the gas turbine core to move through the inlet turbine passageway and interact with the inlet turbine so that the portion of air entering the gas turbine core is cooled before interacting with components of the gas turbine core; and
wherein the inlet assembly comprises an opening that is arranged to allow at least a sub-portion of the portion of air to enter the inlet turbine passageway when the core flow director is in either of the open and closed positions.

2. The high-mach engine of claim 1, wherein the core-flow director includes a collar mounted to slide along the central engine axis from the opened position to the closed position.

3. The high-mach engine of claim 2, wherein the collar forms an annular ring that extends around the central engine axis.

4. The high-mach engine of claim 3, wherein the inlet turbine passageway forms a first annular ring and is coaxial with the collar.

5. The high-mach engine of claim 4, wherein the bypass passageway forms a second annular ring and is coaxial with the inlet turbine passageway.

6. The high-mach engine of claim 1, further comprising an inlet control system including a sensor, a core-flow-director actuator configured to move the core-flow director from the opened position to the closed position, and a controller coupled to the sensor and the core-flow-director actuator, the controller configured to direct the core-flow-director actuator to move the core-flow director from the opened position to the closed position in response to receipt of data from the sensor.

7. The high-mach engine of claim 6, wherein the sensor is configured to detect a parameter associated with the speed of the high-mach engine, and the controller is configured to move the core-flow-director from the opened position to the closed position in response to the data indicative of the speed of the high-mach engine exceeding the predetermined speed of the high-mach engine through a surrounding atmosphere.

8. The high-mach engine of claim 7, wherein the predetermined speed is between about mach 4 and mach 5.

\* \* \* \* \*